United States Patent
Matsushita et al.

(10) Patent No.: US 8,149,300 B2
(45) Date of Patent: Apr. 3, 2012

(54) RADIOMETRIC CALIBRATION FROM NOISE DISTRIBUTIONS

(75) Inventors: Yasuyuki Matsushita, Beijing (CN); Stephen Ssu-te Lin, Beijing (CN)

(73) Assignee: Microsoft Corporation, Redmond, WA (US)

( * ) Notice: Subject to any disclaimer, the term of this patent is extended or adjusted under 35 U.S.C. 154(b) by 834 days.

(21) Appl. No.: 12/110,357

(22) Filed: Apr. 28, 2008

(65) Prior Publication Data

US 2009/0268062 A1 Oct. 29, 2009

(51) Int. Cl.
*H04N 5/217* (2011.01)
*G06K 9/00* (2006.01)

(52) U.S. Cl. .................................. 348/241; 382/167
(58) Field of Classification Search .................. 348/241; 382/167
See application file for complete search history.

(56) References Cited

U.S. PATENT DOCUMENTS

| | | | |
|---|---|---|---|
| 5,757,425 A * | 5/1998 | Barton et al. ............... | 348/241 |
| 7,006,128 B2 | 2/2006 | Xie et al. | |
| 7,084,905 B1 | 8/2006 | Nayar et al. | |
| 7,239,757 B2 | 7/2007 | Kang et al. | |
| 7,239,805 B2 | 7/2007 | Uyttendaele et al. | |
| 2005/0134599 A1 | 6/2005 | Nayar et al. | |
| 2006/0008141 A1 | 1/2006 | Lin et al. | |
| 2006/0126138 A1 | 6/2006 | Bala et al. | |
| 2006/0262973 A1 | 11/2006 | Lin et al. | |
| 2007/0279650 A1 | 12/2007 | Zitnick | |
| 2007/0296721 A1 | 12/2007 | Chang et al. | |

OTHER PUBLICATIONS

Shafique, et al., "Estimation of the Radiometric Response Functions of a Color Camera from Differently Illuminated Images", Proceedings of the IEEE International Conference on Image Processing, 2004, vol. 4, pp. 1-4.
Ortiz, et al., "Radiometric Calibration of CCD Sensors: Dark Current and Fixed Pattern Noise Estimation", 2004 IEEE International Conference on Robotics and Automation, ICRA '04, vol. 5, IEEE, pp. 6.
Kim, et al., "Joint Feature Tracking and Radiometric Calibration from Auto-Exposure Video", IEEE 11th International Conference on Computer Vision, 2007. ICCV 2007, IEEE, pp. 8.
Cerman, "High Dynamic Range Images from Multiple Exposures", Diploma Thesis, Jan. 26, 2006, pp. 52.
Alter, et al., "An Intensity Similarity Measure in Low-Light Conditions", Proc. ECCV 2006, Association for Computing Machinery, Inc, 2006, pp. 14.
Botev, et al., "Global Likelihood Optimization via the Cross-Entropy Method with an Application to Mixture Models", Proceedings of the 36th Conference on Winter Simulation Conference, 2004, pp. 529-535.
Debevec, et al., "Recovering High Dynamic Range Radiance Maps from Photographs", Proceedings of the 24th Annual Conference on Computer Graphics and Interactive Techniques, ACM Press/Addison-Wesley Publishing Co.,1997, pp. 10.
Farid, "Blind Inverse Gamma Correction", IEEE Transactions on Image Processing, vol. 10, Issue 10, 2001, pp. 1-9.

(Continued)

*Primary Examiner* — William Choi
(74) *Attorney, Agent, or Firm* — L. Alan Colins; Collins & Collins Intellectual, LLC (57) ABSTRACT

Technologies that enable correcting for the non-linear relationship between scene irradiance and digital pixel intensity values of an image of the scene produced by a camera. Imaging noise is used as a signal from which a corrective function is derived. Noise distributions from the image are evaluated to determine the radiometric response function of the camera, from which an inverse response function is computed and used for calibration.

20 Claims, 7 Drawing Sheets

OTHER PUBLICATIONS

Grossberg, et al., "Determining the Camera Response from Images: What Is Knowable?", IEEE Transactions on Pattern Analysis and Machine Intelligence, vol. 25, No. 11, Nov. 2003, IEEE Computer Society, IEEE, 2003, pp. 1455-1467.

Grossberg, et al., "What is the Space of Camera Response Functions?", Proceedings of the 2003 IEEE Computer Society Conference on Computer Vision and Pattern Recognition (CVPR'03), vol. 2, IEEE Computer Society, IEEE, 2003, pp. 8.

Kim, et al., "Radiometric Alignment of Image Sequences", Proceedings of the 2004 IEEE Computer Society Conference on Computer Vision and Pattern Recognition (CVPR'04), vol. 1, IEEE Computer Society, IEEE, 2004, pp. 7.

Lin, et al., "Radiometric Calibration from a Single Image", Proceedings of the 2004 IEEE Computer Society Conference on Computer Vision and Pattern Recognition, 2004, vol. 2, IEEE, pp. 8.

Lin, et al., "Determining the Radiometric Response Function from a Single Grayscale Image", Proceedings of the 2005 IEEE Computer Society Conference on Computer Vision and Pattern Recognition, vol. 2, IEEE, 2005, pp. 8.

Liu, et al., "Noise Estimation from a Single Image", Proceedings of the 2006 IEEE Computer Society Conference on Computer Vision and Pattern Recognition, vol. 1, Jun. 17-22, 2006, IEEE, pp. 8.

Mann, et al., "Being 'Undigital' With Digital Cameras: Extending Dynamic Range by Combining Differently Exposed Pictures", 1994, pp. 422-428.

Mitsunaga, et al., "Radiometric Self Calibration", Proceedings of the 1999 IEEE Computer Society Conference on Computer Vision and Pattern Recognition, vol. 1, IEEE, 1999, pp. 374-380.

Nayar, et al., "High Dynamic Range Imaging: Spatially Varying Pixel Exposures", Proceedings of the 2000 IEEE Computer Society Conference on Computer Vision and Pattern Recognition, vol. 1, IEEE, 2000, pp. 8.

Pal, et al., "Probability Models for High Dynamic Range Imaging", Proceedings of the 2004 IEEE Computer Society Conference on Computer Vision and Pattern Recognition (CVPR'04), vol. 2, 2004, pp. 8.

Tsin, et al., "Statistical Calibration of CCD Imaging Process", 2001, IEEE, pp. 480-487.

S. Mann, "Quantigraphic Imaging: Estimating the camera response and exposures from differently exposed images", In Proc. Of Comp. Vis. and Pattern Rec. (CVPR), vol. 1, pp. 842-849, 2001. Previously titled prior to publication, "Comparametric imaging: Estimating both the unknown response and the unknown set of exposures in a plurality of differently exposed images".

J. A. Helder, "A simplex method for function minimization", Computer Journal, vol. 7, pp. 308-313, 1965.

S. Rice, "Mathematical Analysis of Random Noise", Bell Systems Tech. J., 23:282-332, 1944.

Landauer, R. "Condensed matter physics: The noise is the signal", Nature, vol. 392:658-659, Apr. 16, 1998.

* cited by examiner

RADIOMETRIC CALIBRATION FROM NOISE DISTRIBUTIONS

BACKGROUND

Many computer vision algorithms rely on the assumption that image intensities are linearly related to the image irradiance recorded at the camera sensor. Since most cameras non-linearly alter irradiance values for purposes such as dynamic range compression, this assumption generally does not hold. It is therefore important to calibrate the response function of the camera so that the non-linear mapping can be inverted and subsequent algorithms can assume linearity of intensity observations.

Radiometric calibration aims to estimate the response function $f$ of a camera. The radiometric response function $f$ maps irradiance I that is captured at the sensor to the image intensity M that is read from the camera:

$$M = f(I)$$

For vision algorithms and the like that require irradiance values I rather than measured intensity M as input, the inverse response function $g = f^{-1}$ needs to be determined so that measured intensities can be made linear with respect to irradiances. Since response functions $f$ are typically monotonic, they tend to be invertible.

Many conventional methods for estimating a camera response function require as input an image sequence taken with varying exposures from a fixed camera. A few methods allow some camera movement or scene motion, but still require changes in exposure level. But in many applications such as those of web cameras, multiple images at different exposures cannot be obtained for radiometric calibration. Accordingly, some previous methods have been proposed without the need to make adjustments in camera exposure settings. But such methods may require assumptions about the radiometric response function of a camera that are often invalid. Other previous methods may rely on statistical distributions of irradiance but may be susceptible to image noise. Previous methods of radiometric calibration tend to be degraded by imaging noise, particularly by high noise levels.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present examples provide technologies that enable correcting for the non-linear relationship between scene irradiance and digital pixel intensity values of an image of the scene produced by a camera. Imaging noise is used as a signal from which a corrective function is derived. Noise distributions from the image are evaluated to determine the radiometric response function of the camera, from which an inverse response function is computed and used for calibration.

Many of the attendant features will be more readily appreciated as the same become better understood by reference to the following detailed description considered in connection with the accompanying drawings.

DESCRIPTION OF THE DRAWINGS

The present description will be better understood from the following detailed description considered in connection with the accompanying drawings, wherein.

Like reference numerals are used to designate like parts in the accompanying drawings.

DETAILED DESCRIPTION

The detailed description provided below in connection with the accompanying drawings is intended as a description of the present examples and is not intended to represent the only forms in which the present examples may be constructed or utilized. The description sets forth at least some of the functions of the examples and/or the sequence of steps for constructing and operating examples. However, the same or equivalent functions and sequences may be accomplished by different examples.

Although the present examples are described and illustrated herein as being implemented in a computing environment, the system described is provided as an example and not a limitation. As those skilled in the art will appreciate, the present examples are suitable for application in a variety of different types of computing environments or the like.

Radiometric calibration is a process of determining the relationship between the physical brightness of a scene (scene radiance) and digital pixel values of an image of the scene (intensity observations) as produced by a camera or the like. Typically there is a non-linear relationship between the scene radiance and image intensity, the non-linearity varying with different cameras. The technologies described herein enable correcting for this non-linear relationship by using imaging noise as a signal from which a corrective function can be derived.

Figure 1:
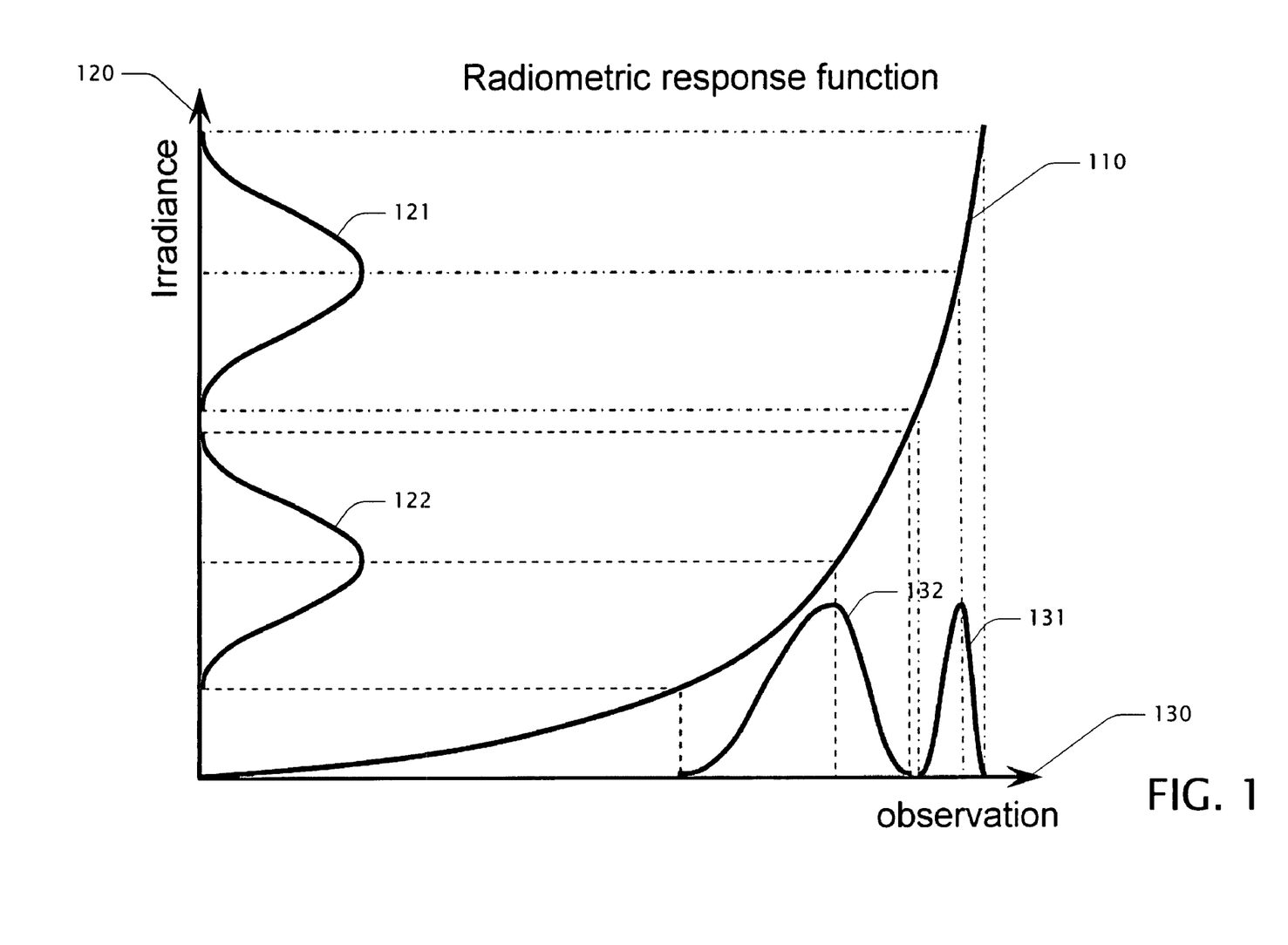
FIG. 1 is diagram showing symmetric profiles of noise distributions in the image radiance domain and the corresponding asymmetric profiles of the noise distributions in the observation domain skewed by the non-linearity of the radiometric response function.

FIG. 1 is diagram showing symmetric profiles 121 and 122 of noise distributions in the image radiance domain (e.g., on axis 120) and the corresponding asymmetric profiles 131 and 132 of the noise distributions in the observation domain (e.g., on axis 130) skewed by the non-linearity of the radiometric response function 110. The profiles on irradiance axis 120 represent the intensity of light reflected from a scene that enters a camera. The corresponding profiles on observation axis 130 represent intensity values of an image of the scene captured by a camera. Curve 110 represents the radiometric response function of the camera that maps the intensity of the irradiance that enters the camera to the observed intensity of the image that is output from the camera.

Irradiance curves 121 and 122 each represent a distribution of noise around a given irradiance intensity value. Each noise distribution is shown symmetrically distributed around the true intensity value. However, the corresponding observed noise distributions 131 and 132 are asymmetrically skewed.

Because of the symmetrically random nature of noise sources in the imaging process, asymmetry of the observed noise distributions is the result of a non-linear transformation that occurs in the camera due to the radiometric response function. The terms "radiometric response function" and "response function" are generally used herein synonymously. The term "inverse response function" generally refers to a function that is the inverse of a radiometric response function.

As known to those of skill in the art, noise distributions, such as distributions 121 and 122, may be derived in a variety of conventional ways. In one example, this may be done by measuring the intensity of a pixel over a number of video frames with a fixed camera viewing a static scene, in another example, this may be done by grouping pixels within an image that are expected to have the same scene intensity. Other methods or techniques may alternatively or additionally be used to derive suitable noise distributions.

Noise has widely been considered a nuisance in computer vision, but the technologies provided herein make use of noise as a signal for estimating radiometric response functions, even high levels of noise. The technologies provided make use of the symmetry of noise distributions, which is not affected by noise level. In general, imaging noise tends to be symmetrical in nature. Since noise in inevitable in imaging, these technologies have wide applicability.

One significant source of imaging noise is the camera itself. Noise is introduced into intensity observations at multiple points along the imaging pipeline of a camera. The terms "noise" and "imaging noise" and the like as used herein generally refer to disturbances that cause an observed intensity value to vary from the actual irradiance intensity of a scene. Prominent sources of noise may include random noise associated with analog to digital ("A/D") conversion and uneven photon flow from the original scene, fixed pattern noise due to differences in sensitivity among photon detectors in the imaging array, and dark current noise that results from measurement of thermal radiation within the camera. Alternatively or additionally, other sources of imaging noise may affect observed image intensity. Such noise is generally considered symmetrical in nature.

The terms "irradiance intensity", "true scene intensity", "true intensity value", and the like as used herein generally refer to the actual scene radiance arriving at a camera. These values are typically perturbed by imaging noise before being represented in a digital image produced by the camera. The term "observed intensity value" or the like generally refers to an intensity value based on scene radiance and potentially impacted imaging noise. The terms "noise curve", "curve", "profile", "noise distribution", and the like as used herein typically refer to a representation of the noise characteristics of a camera providing the observed intensity values. Such noise characteristics are generally represented by a radiometric response function.

Figure 2:
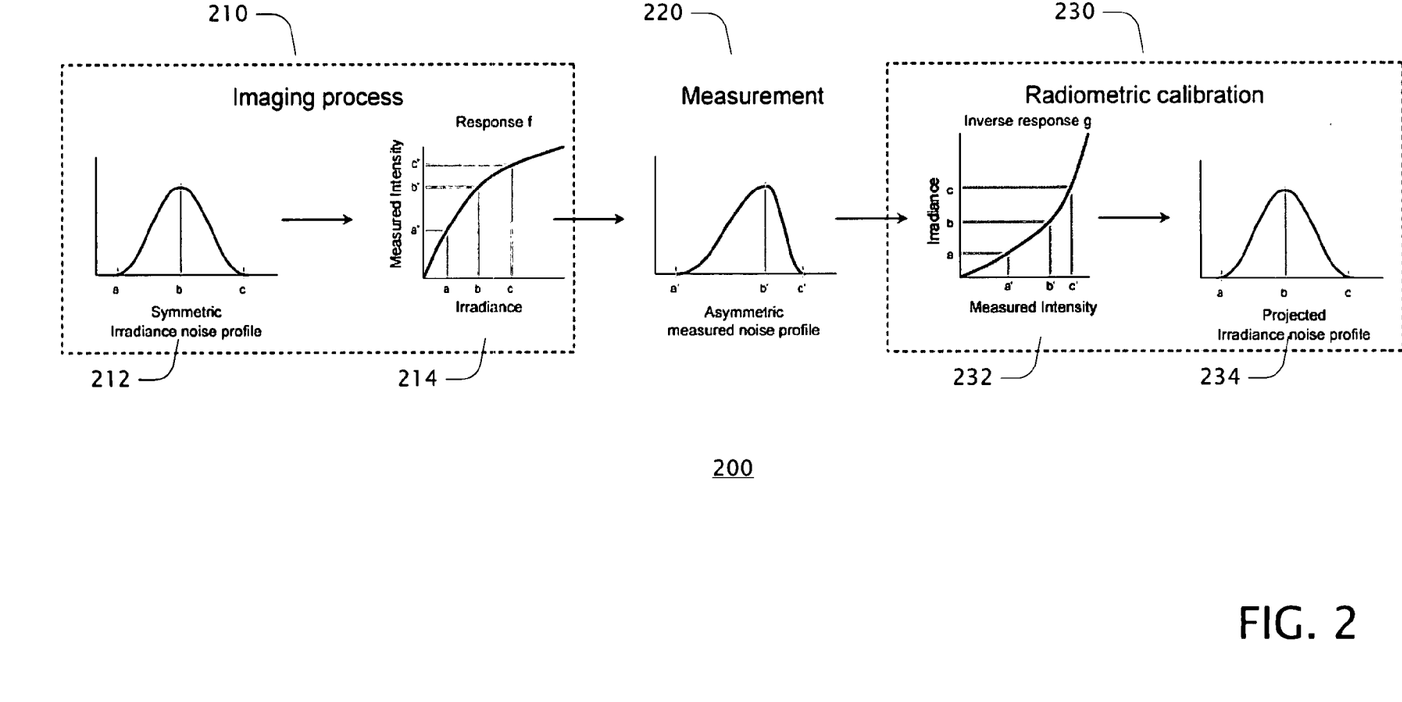
FIG. 2 is a diagram showing an example method for radiometric calibration of a camera.

FIG. 2 is a diagram showing an example method 200 for radiometric calibration of a camera. In general, method 200 includes examining noise profiles at multiple intensity levels to estimate a radiometric response function describing the noise characteristics of the camera. The radiometric response function describes the transformation of symmetrical noise distributions viewed by the camera into the corresponding asymmetrical noise distributions output by the camera. Because a radiometric response function is monotonic, an inverse response function can be estimated and used to radiometrically calibrate the camera.

Block 210 generally illustrates the imaging process performed by the camera. Scene irradiance is viewed by the camera resulting in symmetric irradiance noise profiles 212 at each viewed intensity level due to the noise characteristics of the camera. Camera noise characteristics may be modeled by a radiometric response function $f$ 214 which describes the transformation of the viewed symmetrical noise profiles into measured asymmetric noise profiles 220 at image intensity levels output by the camera.

Block 230 generally illustrates radiometric calibration of the camera including estimating an inverse response function $g$ 212 based on function $f$ 214 that can be applied to image intensity values resulting in projected irradiance noise distributions 234 consistent with the symmetric irradiance noise profiles 212 originally viewed by the camera.

Figure 3:
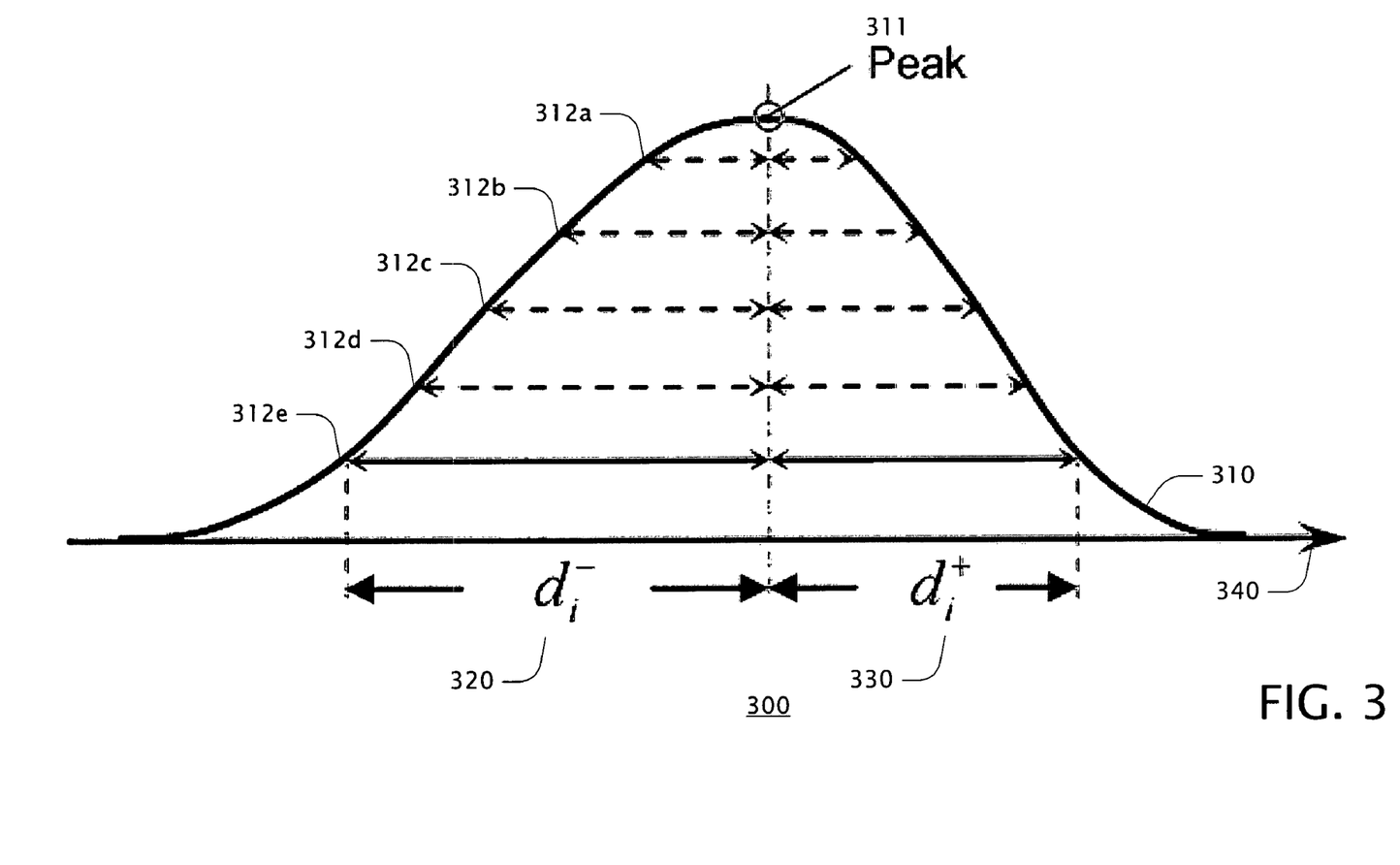
FIG. 3 is a diagram showing an example of measuring the degree of symmetry of a noise distribution.

FIG. 3 is a diagram showing an example of measuring the degree of symmetry of a noise distribution 310. Such a noise distribution is generally based on multiple samples of a particular intensity. In one example, such a noise distribution may be obtained by combining the intensity values from the same pixel of multiple samples of the same scene. The number of such samples may be about 100. In other examples, any suitable technique can be used to obtain a noise distribution, including conventional techniques.

Axis 340 typically indicates intensity level. Peak 311 represents the most frequent intensity level in distribution 310, the distribution mode. The symmetry metric S may be calculated by computing the distance from distribution mode 311 to the profile of the distribution at multiple different heights, e.g., example heights 312a-312e. At each i-th height in the distribution q 310, the distance to the profile on the left $d_{q,i}^-$ 320 and on the right $d_{q,i}^+$ 330 of peak 311 are respectively computed. The degree of symmetry of distribution q 310 is then evaluated as:

$$S(q) = -\frac{1}{n}\sum_{i=1}^{n}\left(\frac{d_{q,i}^- - d_{q,i}^+}{d_{q,i}^- + d_{q,i}^+}\right)^2 \quad \text{Equation (1)}$$

where n is the number of heights to be evaluated. A larger value of n typically yields a more accurate result at a cost of greater computation time, which is generally proportional to n. In one example, a value of 20 for n is sufficient. The denominator of Equation (1) normalizes each term by the distribution width at the given height. Larger values of S (as S tends to zero) generally indicate greater symmetry. While any symmetry metric or skewness metric may in principle be used in place of Equation (1), other metrics may be less sensitive to slight changes in distribution structure.

With the symmetry measure of Equation (1), the inverse response function g can be computed from a set of collected noise profiles Ω by maximizing the following energy function so as to maximize the symmetry of all the distributions in Ω:

$$E(g;\Omega) = \frac{1}{|\Omega|}\sum_{q\in\Omega}S(g;q) = \frac{1}{|\Omega|}\sum_{q\in\Omega}S(g(q)) \quad \text{Equation (2)}$$

where |Ω| represents the number of noise distributions in set Ω. This function evaluates the degree of symmetry of noise profiles that are projected to the irradiance domain by the inverse response function g.

While $\text{argmax}_g E(g)$ gives the optimal estimate of the inverse response function g, it may be computationally difficult to solve for a non-parametric inverse response function because of the large number of intensity levels (e.g., 256 intensity levels for 8-bit images).

To facilitate optimization, a parametric model based on a principal components analysis ("PCA") on a database of real-world response functions may be utilized. The response functions in the database of response functions or the like are first inverted so that the principal components of the inverse response functions can be computed. With these principal components, an inverse response function g can be represented as:

$$g = g_0 + Hc \qquad \text{Equation (3)}$$

where $g_0$ is the mean response function of the inverse response functions in the database of response functions, H is the matrix whose columns are composed of the first N eigenvectors, and c is an N-dimensional vector of PCA coefficients. In one example the value for N is set to 5. With this representation of inverse response functions, the problem is transformed into estimating the N coefficients of c:

$$\hat{c} = \underset{c}{\operatorname{argmax}} E(g; g = g_0 + Hc) \qquad \text{Equation (4)}$$

The database of response functions ("DoRF") typically includes a set of captured response functions from many different cameras that have been inverted. A model, such as described in Equation (3), may be formed based on principal components analysis of the major variations of the many inverse response functions in the DoRF. The set of inverse response functions in the DoRF can be indexed by vector c. In the example where N=5, Equation (3) can be solved for the 5 parameters that describe the inverse response function in the DoRF that best maximizes the energy of Equation (2), thus maximizing the symmetry of all the distributions in Ω. In alternate example, any number of parameters or dimensions N may be used to model the response functions in the DoRF.

Note that the Intensity axis 340 represents a range of intensity. As known to those of skill in the art, pixel values of a digital image are typically discrete values within such a range. For example, a grayscale intensity range may be represented using 8 bits to provide 256 possible grayscale intensity values ranging from 0 to 255. Similar representations may be used for different color intensity ranges, such as for the intensity of each of red, green, and blue ("RGB") or the like. Alternatively, other scales or bit counts or value ranges may be used to represent various types of scene intensity. The technologies described herein may be applied to grayscale intensities and/or to individual or combined color intensities.

Figure 4:
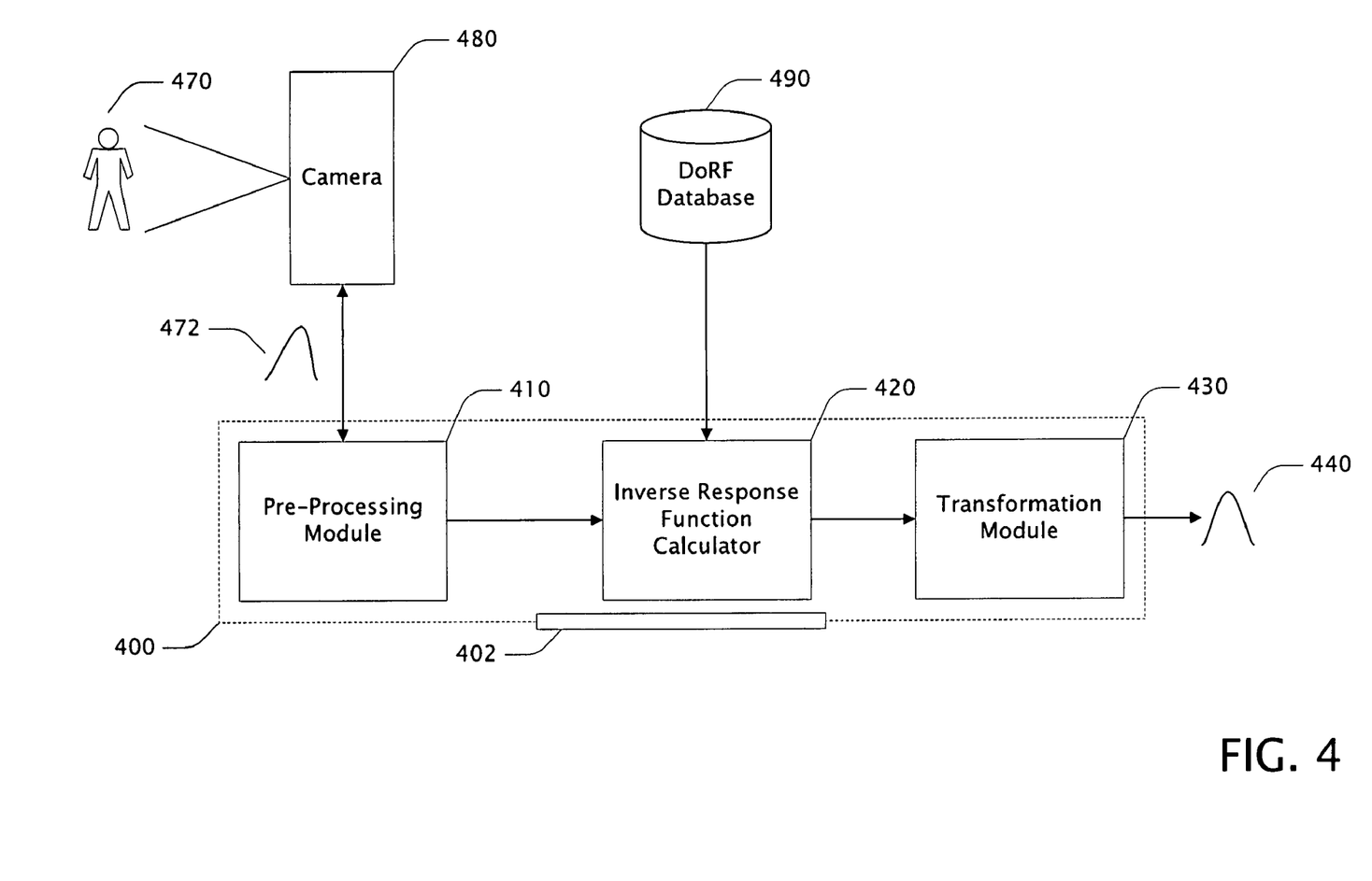
FIG. 4 is a block diagram of an example system for radiometrically calibrating a camera.

FIG. 4 is a block diagram of an example system 400 for radiometrically calibrating a camera. Example system 400 typically includes pre-processing module ("PPM") 410, inverse response function calculator ("IRFC") 420, and transformation module ("TRAM") 430. Interface 402 may enable system 400 to be accessed and/or controlled by, or to interface with, any other system, device, user, camera 490, or the like. These elements may be further broken down into sub-elements and/or may be combined in whole or in part with one or more of the other elements or sub-elements. Database of response functions 490 may be distinct from system 400 or may be included as an element of system 400. System 400 may be integrated into camera 480 or may be distinct from camera 480.

PPM 410 typically accepts image data from camera 480 or from any other source of image data, such as a storage device or the like. Such image data may be in the form of an image file or the like. The image data may represent a scene or scenes 470 viewed by camera 480 or the like. The image data is typically stored and converted to a set of distributions. In particular, one or more asymmetric noise distributions 472 may be derived from the image data, the asymmetry of the noise distributions typically resulting from imaging noise related to camera 480. PPM 410 typically evaluates the image data and calculates a radiometric response function $f$ that describes the asymmetry of distributions 472 relative to the symmetric noise distributions of the original scene 470, accounting for the imaging noise. The radiometric response function $f$ may be similar to or the same as that described in connection with block 210 of FIG. 2. In general, PPM 410 may be a software module(s), process(es), application(s), firmware routine(s), electronic module(s), device(s), a combination of two or more of the foregoing, or any other pre-processing means operable to accept image data input and to derive therefrom a set of asymmetric noise distributions.

IRFC 420 typically calculates the inverse response function g from the radiometric response function $f$. The inverse response function g may be calculated as described in connection with FIG. 3. IRFC 420 may make use of DoRF 490 (such as that described in connection with FIG. 3) in optimizing the calculation of g. In general, IRFC 420 may be a software module(s), process(es), application(s), firmware routine(s), electronic module(s), device(s), a combination of two or more of the foregoing, or any other calculation means operable to accept noise distribution(s) and/or response function(s) as input and to derive therefrom an inverse response function.

TRAM 430 typically applies inverse response function g to the imaging data to correct for any imaging noise introduced by camera 480 or the like, resulting in corrected image data as suggested by symmetric distribution 440. In this manner, noise, regardless of level, is used as a signal for curing image data of negative effects caused by the noise. In general, TRAM 430 may be a software module(s), process(es), application(s), firmware routine(s), electronic module(s), device(s), a combination of two or more of the foregoing, or any other transformation means operable to transform image data based on an inverse response function.

Figure 5:
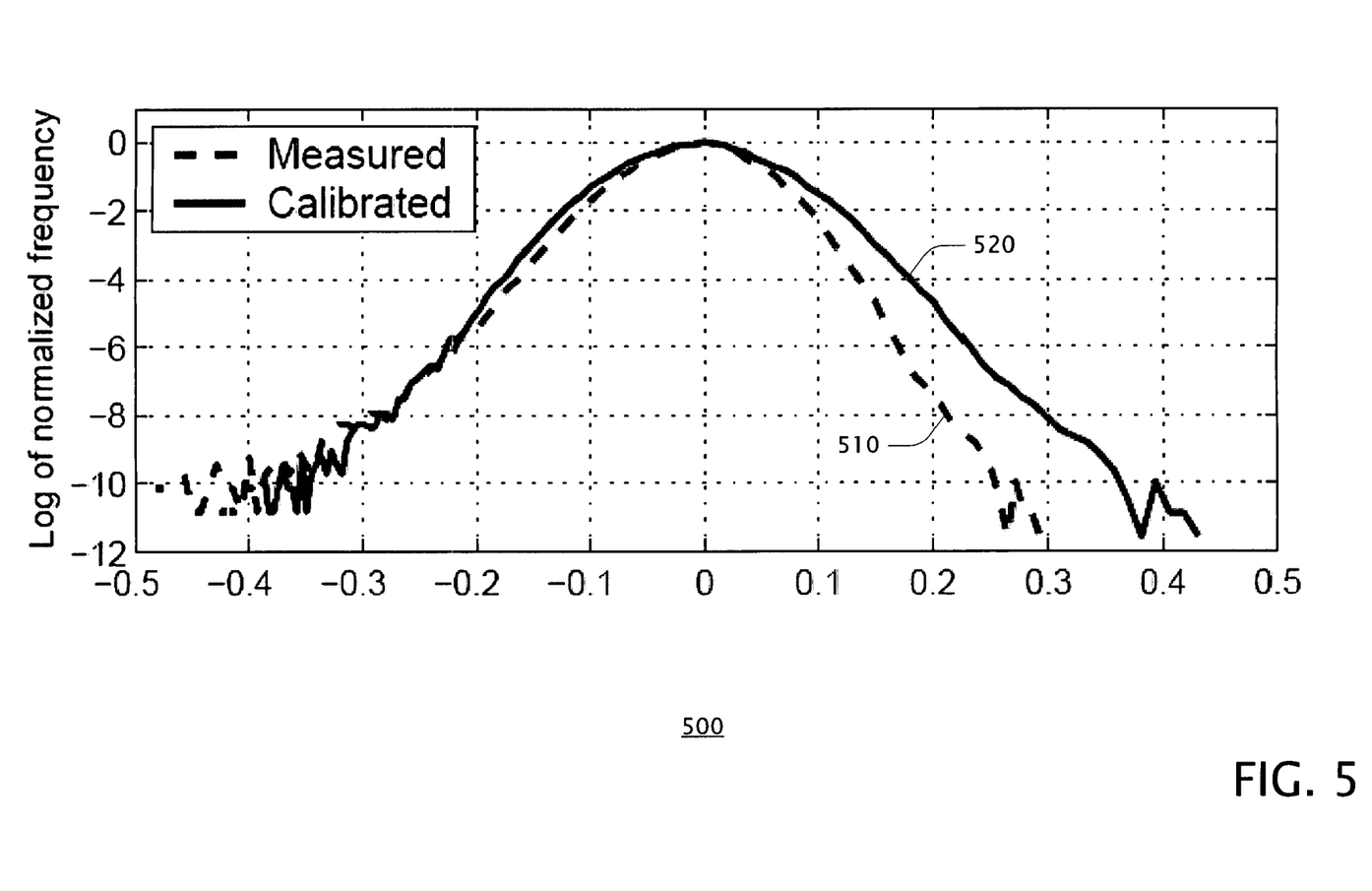
FIG. 5 is a diagram showing a chart including an example measured noise profile and a corresponding noise profile after calibration.

FIG. 5 is a diagram showing a chart 500 including an example measured noise profile 510 and a corresponding noise profile 520 after calibration. Noise profile 510 was measured using a Canon EOS 20D camera (ISO 1600). Chart 500 shows a real-world example of how a measured asymmetric noise profile is projected using a radiometric response function into a symmetric distribution in the irradiance domain.

Figure 6A:
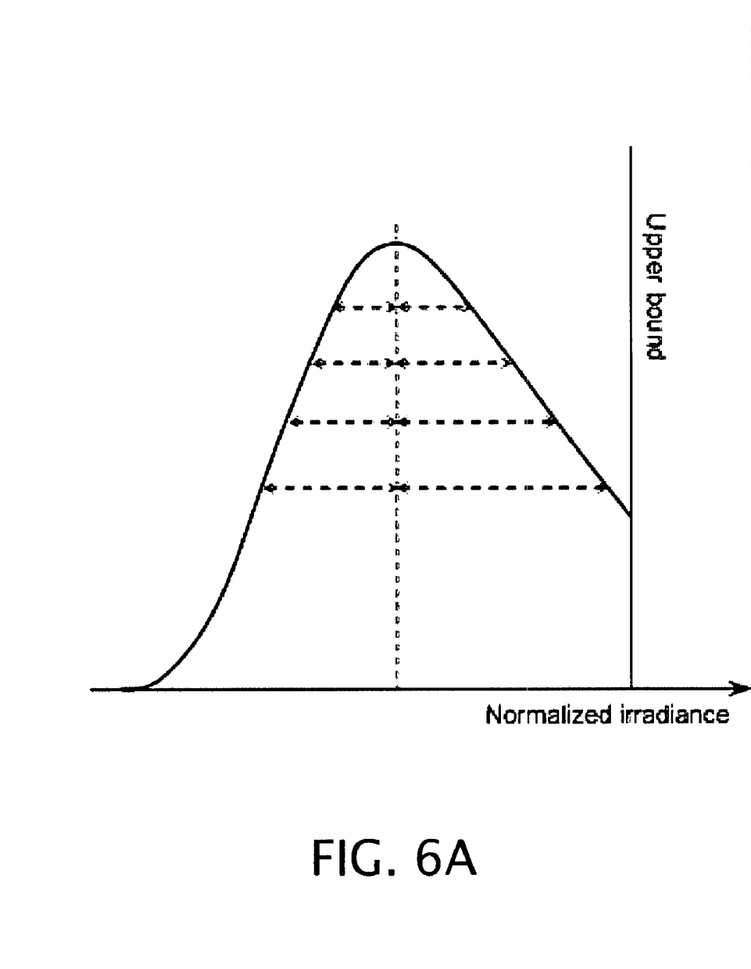
FIGS. 6A and 6B show examples of incomplete noise distributions.
Figure 6B:
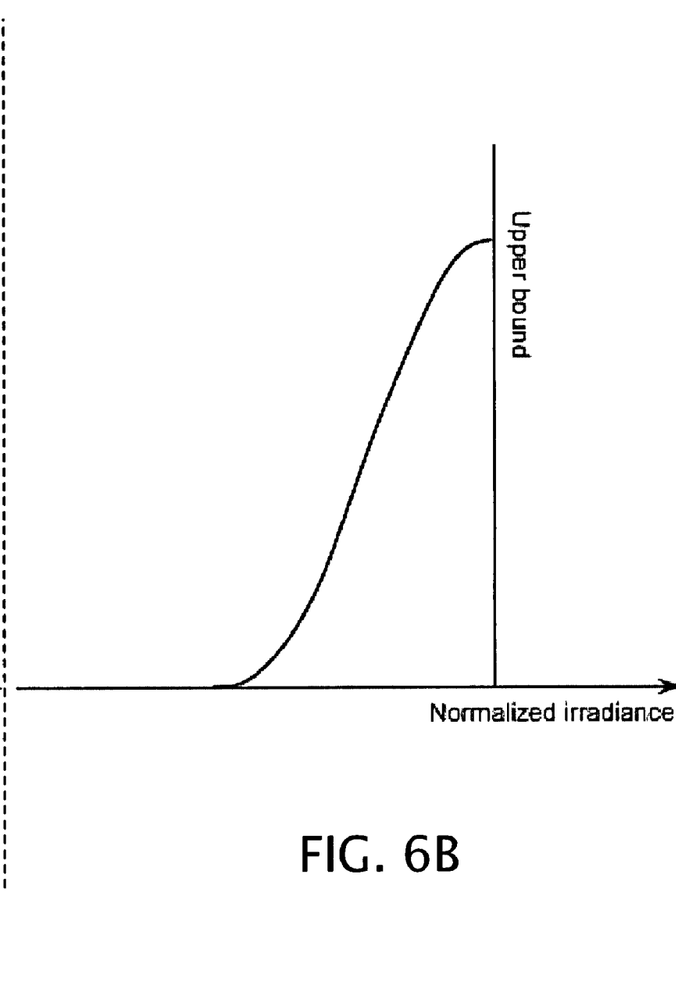

FIGS. 6A and 6B show examples of incomplete noise distributions. FIG. 6A shows a partial distribution of which the upper portion can be used for evaluating the degree of symmetry. FIG. 6B shows a partial distribution that is typically discarded due to insufficient symmetry data. Noise distributions may run up against an upper bound (such as shown in FIGS. A and B) or a lower bound or both. Such bounds may be the limits of irradiance intensity that a camera or the like can measure.

In such cases where noise profiles $g(\forall\ q \in \Omega)$ do not cover the entire range of irradiance values, there may exist multiple solutions that result in symmetry of noise distributions. To avoid this ambiguity, additional constraints on the inverse response function, such as smoothness and monotonicity, may be used. In one example, data from a DoRF (such as that described in connection with FIG. 4) may be used to regulate the solution.

Using the eigenvectors of Equation (3), the PCA coefficients of each inverse response function in the DoRF may be computed. Then a model on inverse response functions may be constructed by fitting a multivariate Gaussian mixture model to the set of PCA coefficients:

$$p(g) = \sum_{i=1}^{K} \alpha_i \mathcal{N}\left(g; u_i, \sum_i\right) \quad \text{Equation (5)}$$

where N represents a normal distribution with mean $\mu_i$ and covariance matrix $\Sigma_i$. In one example, the value of K is empirically set to 5, and the mixture model is obtained using a conventional cross-entropy method. Further, the likelihood of the degree of symmetry may be modeled as:

$$p(\Omega \mid g) = \frac{1}{Z} \exp(-\lambda E(g; \Omega)) \quad \text{Equation (6)}$$

which is a variation of Equation (2), where Z is the normalization factor, and where it is a regularization coefficient which, in one example, is empirically set to $10^4$.

The optimal coefficients ĉ that define the inverse response function g may be solved for in the following maximum a posteriori (MAP) problem:

$$\hat{c} = \mathrm{argmax}_c\, p(g(c) \mid \Omega) = \mathrm{argmax}_c\, p(\Omega \mid g(c)) p(g(c)) \quad \text{Equation (7)}$$

Inserting Equations (5) and (6) into the logarithmic form of Equation (7) results in:

$$\hat{c} = \mathrm{argmin}_c\, \lambda E(g(c); \Omega) - \log p(g(c)) \quad \text{Equation (8)}$$

where the optimized coefficients ĉ yield an estimate of the inverse response function as $g = g_0 + Hc$.

Figure 7:
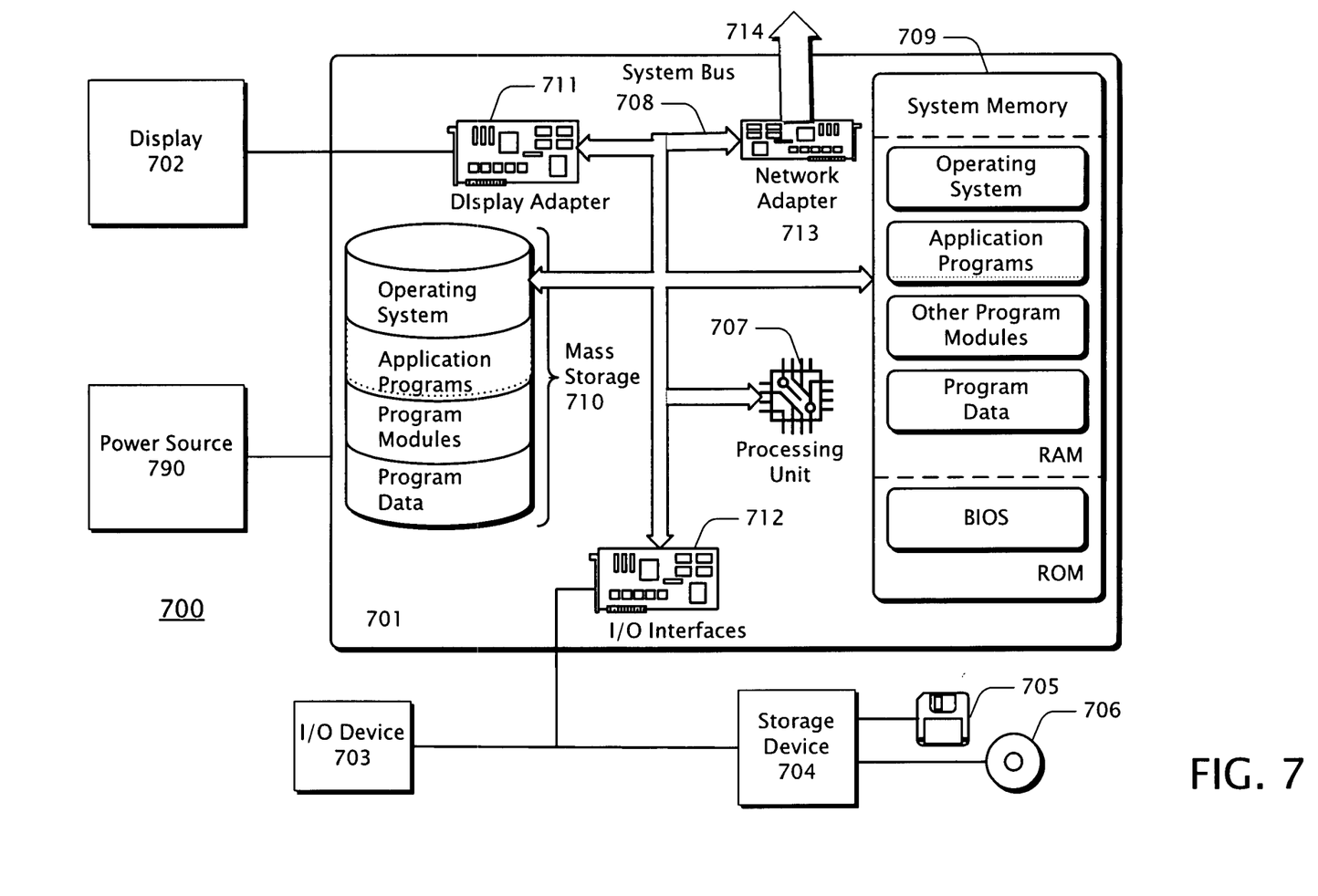
FIG. 7 is a block diagram showing an example computing environment in which the technologies described herein may be implemented.

FIG. 7 is a block diagram showing an example computing environment 700 in which the technologies described herein may be implemented. A suitable computing environment may be implemented with numerous general purpose or special purpose systems. Examples of well known systems may include, but are not limited to, cell phones, digital cameras, personal digital assistants ("PDA"), personal computers ("PC"), hand-held or laptop devices, microprocessor-based systems, multiprocessor systems, servers, workstations, consumer electronic devices, set-top boxes, and the like.

Computing environment 700 typically includes a general-purpose computing system in the form of a computing device 701 coupled to various components, such as peripheral devices 702, 703, 704 and the like. System 700 may couple to various other components, such as input devices 703, including voice recognition, touch pads, buttons, keyboards and/or pointing devices, such as a mouse or trackball, via one or more input/output ("I/O") interfaces 712. The components of computing device 701 may include one or more processors (including central processing units ("CPU"), graphics processing units ("GPU"), microprocessors ("µP"), and the like) 707, system memory 709, and a system bus 708 that typically couples the various components. Processor 707 typically processes or executes various computer-executable instructions to control the operation of computing device 701 and to communicate with other electronic and/or computing devices, systems or environment (not shown) via various communications connections such as a network connection 714 or the like. System bus 708 represents any number of several types of bus structures, including a memory bus or memory controller, a peripheral bus, a serial bus, an accelerated graphics port, a processor or local bus using any of a variety of bus architectures, and the like.

System memory 709 may include computer readable media in the form of volatile memory, such as random access memory ("RAM"), and/or non-volatile memory, such as read only memory ("ROM") or flash memory ("FLASH"). A basic input/output system ("BIOS") may be stored in non-volatile or the like. System memory 709 typically stores data, computer-executable instructions and/or program modules comprising computer-executable instructions that are immediately accessible to and/or presently operated on by one or more of the processors 707.

Mass storage devices 704 and 710 may be coupled to computing device 701 or incorporated into computing device 701 via coupling to the system bus. Such mass storage devices 704 and 710 may include non-volatile RAM, a magnetic disk drive which reads from and/or writes to a removable, non-volatile magnetic disk (e.g., a "floppy disk") 705, and/or an optical disk drive that reads from and/or writes to a non-volatile optical disk such as a CD ROM, DVD ROM 706. Alternatively, a mass storage device, such as hard disk 710, may include non-removable storage medium. Other mass storage devices may include memory cards, memory sticks, tape storage devices, and the like.

Any number of computer programs, files, data structures, and the like may be stored in mass storage 710, other storage devices 704, 705, 706 and system memory 709 (typically limited by available space) including, by way of example and not limitation, operating systems, application programs, data files, directory structures, computer-executable instructions, and the like.

Output components or devices, such as display device 702, may be coupled to computing device 701, typically via an interface such as a display adapter 711. Output device 702 may be a liquid crystal display ("LCD"). Other example output devices may include printers, audio outputs, voice outputs, cathode ray tube ("CRT") displays, tactile devices or other sensory output mechanisms, or the like. Output devices may enable computing device 701 to interact with human operators or other machines, systems, computing environments, or the like. A user may interface with computing environment 700 via any number of different I/O devices 703 such as a touch pad, buttons, keyboard, mouse, joystick, game pad, data port, and the like. These and other I/O devices may be coupled to processor 707 via I/O interfaces 712 which may be coupled to system bus 708, and/or may be coupled by other interfaces and bus structures, such as a parallel port, game port, universal serial bus ("USB"), fire wire, infrared ("IR") port, and the like.

Computing device 701 may operate in a networked environment via communications connections to one or more remote computing devices through one or more cellular networks, wireless networks, local area networks ("LAN"), wide area networks ("WAN"), storage area networks ("SAN"), the Internet, radio links, optical links and the like. Computing device 701 may be coupled to a network via network adapter 713 or the like, or, alternatively, via a modem, digital subscriber line ("DSL") link, integrated services digital network ("ISDN") link, Internet link, wireless link, or the like.

Communications connection 714, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. By way of example, and not limitation, communications media may include wired media, such as a wired network or direct-wired connection or the like, and wireless media, such as acoustic, radio frequency, infrared, or other wireless communications mechanisms.

Power source 790, such as a battery or a power supply, typically provides power for portions or all of computing environment 700. In the case of the computing environment 700 being a mobile device or portable device or the like, power source 790 may be a battery. Alternatively, in the case computing environment 700 is a desktop computer or server or the like, power source 790 may be a power supply designed to connect to an alternating current ("AC") source, such as via a wall outlet.

Some mobile devices may not include many of the components described in connection with FIG. 7. For example, an electronic badge may be comprised of a coil of wire along with a simple processing unit 707 or the like, the coil configured to act as power source 790 when in proximity to a card reader device or the like. Such a coil may also be configure to act as an antenna coupled to the processing unit 707 or the like, the coil antenna capable of providing a form of communication between the electronic badge and the card reader device. Such communication may not involve networking, but may alternatively be general or special purpose communications via telemetry, point-to-point, RF, IR, audio, or other means. An electronic card may not include display 702, I/O device 703, or many of the other components described in connection with FIG. 7. Other mobile devices that may not include many of the components described in connection with FIG. 7, by way of example and not limitation, include electronic bracelets, electronic tags, implantable devices, and the like.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" typically refers to executable instructions, code, data, applications, programs, or the like maintained in an electronic device such as a ROM. The term "software" generally refers to executable instructions, code, data, applications, programs, or the like maintained in or on any form of computer-readable media. The term "computer-readable media" typically refers to system memory, storage devices and their associated media, and the like.

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

The invention claimed is:

1. A method for performing radiometric calibration comprising:
constructing a set of noise distributions based on intensity values of a digital image of a scene;
measuring a degree of symmetry of each of the set of noise distributions, wherein the degree of symmetry indicates imaging noise;
computing an inverse response function based on the degree of symmetry of each of the set of noise distributions; and
transforming the digital image using the inverse response function, wherein the radiometric calibration is based on the imaging noise.

2. The method of claim 1 further comprising computing a radiometric response function based on a degree of symmetry of at least one noise distribution of the set of noise distributions.

3. The method of claim 1 wherein the measuring the degree of symmetry is based on the equation:

$$S(q) = -\frac{1}{n}\sum_{i=1}^{n}\left(\frac{d_{q,i}^{-} - d_{q,i}^{+}}{d_{q,i}^{-} + d_{q,i}^{+}}\right)^2$$

where S represents the degree of symmetry, and where q represents a noise distribution of the set of noise distributions, and where $d_{q,i}^{-}$ represents a left distance from the left of a peak to a profile of the noise distribution at an i-th height of the noise distribution, and where $d_{q,i}^{+}$ represents a right distance from the right of the peak to the profile at the i-th height, and where n is a number of heights being evaluated.

4. The method of claim 1 wherein computing the inverse response function is based on maximizing the energy function:

$$E(g; \Omega) = \frac{1}{|\Omega|}\sum_{q \in \Omega} S(g; q) = \frac{1}{|\Omega|}\sum_{q \in \Omega} S(g(q))$$

where g represents the inverse response function, and where $|\Omega|$ represents a number of the noise distributions in $\Omega$, the set of noise distributions, where S represents the degree of symmetry, and where q represents a noise distribution of the set of noise distributions $\Omega$.

5. The method of claim 1 wherein the inverse response function is represented as:

$g = g_0 + Hc$ where $g_0$ is a mean response function of a plurality of response functions, and where H is a matrix whose columns are composed of N eigenvectors, and where c is an N-dimensional vector of principal components analysis coefficients.

6. The method of claim 1 wherein the computing the inverse response function comprises selecting an inverse response function from a database of inverse response functions wherein the selected inverse response function is indexed by a set of coefficients of a parametric model of the inverse response functions in the database.

7. A system for performing a radiometric calibration comprising:
   a radiometric response function calculator operable to derive a set of noise distributions from a digital image of a scene;
   an inverse response function calculator operable to calculate a symmetry metric for each of the noise distributions of the set of noise distributions, the symmetry metric indicating imaging noise, and operable to compute an inverse response function based on each of the noise distributions of the set of noise distributions; and
   a transformation module is operable to perform a transformation the digital image based on the inverted response function, wherein the transformation is based on the imaging noise.

8. The system of claim 7 wherein the radiometric response function calculator is further operable to calculate a radiometric response function based on a symmetry metric of at least one noise distribution of the set of noise distributions.

9. The system of claim 7 wherein the symmetry metric is based on the equation:

$$S(q) = -\frac{1}{n}\sum_{i=1}^{n}\left(\frac{d_{q,i}^- - d_{q,i}^+}{d_{q,i}^- + d_{q,i}^+}\right)^2$$

where S represents the degree of symmetry, and where q represents a noise distribution of the set of noise distributions, and where $d_{q,i}^-$ represents a left distance from the left of a peak to a profile of the noise distribution at an i-th height of the noise distribution, a where $d_{q,i}^+$ represents a right distance from the right of the peak to the profile at the i-th height, and where n is a number of heights being evaluated.

10. The system of claim 7 wherein the inverse response function is based on maximizing the energy function:

$$E(g;\Omega) = \frac{1}{|\Omega|}\sum_{q\in\Omega} S(g;q) = \frac{1}{|\Omega|}\sum_{q\in\Omega} S(g(q))$$

where g represents the inverse response function, and where $|\Omega|$ represents a number of the noise distributions in $\Omega$, the set of noise distributions, where S represents the symmetry metric, and where q represents a noise distribution of the set of noise distributions $\Omega$.

11. The system of claim 7 wherein inverse response function is represented as:

$$g = g_0 + Hc$$

where $g_0$ is a mean response function of a plurality of response functions, and where H is a matrix whose columns are composed of N eigenvectors, and where c is an N-dimensional vector of principal components analysis coefficients.

12. The system of claim 7 wherein the inverse response function is computed by selecting an inverse response function from a database of inverse response functions wherein the inverse response functions are captured from different cameras.

13. The system of claim 7 wherein, if the noise distributions of the set of noise distributions do not cover an entire range of irradiance values, the inverse response function is computed by fitting a multivariate mixture model to a set of coefficients.

14. The system of claim 7 further comprising:
   a database of response functions captured from different cameras; and
   a parametric model based on principal component analysis of the response functions of the database.

15. A computer-readable medium comprising computer-readable instructions that embody a method for performing radiometric calibration comprising:
   constructing a set of noise distributions based on intensity values of a digital image of a scene;
   measuring a degree of symmetry of each of the set of noise distributions, wherein the degree of symmetry indicates imaging noise;
   computing an inverse response function based on the degree of symmetry of each of the set of noise distributions; and
   transforming the digital image using the inverse response function, wherein the radiometric calibration is based on the imaging noise.

16. The computer-readable medium of claim 15, the method further comprising computing a radiometric response function based on a degree of symmetry of at least one noise distribution of the set of noise distributions.

17. The computer-readable medium of claim 15 wherein the measuring the degree of symmetry is based on the equation:

$$S(q) = -\frac{1}{n}\sum_{i=1}^{n}\left(\frac{d_{q,i}^- - d_{q,i}^+}{d_{q,i}^- + d_{q,i}^+}\right)^2$$

where S represents the degree of symmetry, and where q represents a noise distribution of the set of noise distributions, and where $d_{q,i}^-$ represents a left distance from the left of a peak to a profile of the noise distribution at an i-th height of the noise distribution, a where $d_{q,i}^+$ represents a right distance from the right of the peak to the profile at the i-th height, and where n is a number of heights being evaluated.

18. The computer-readable medium of claim 15 wherein computing the inverse response function is based on maximizing the energy function:

$$E(g;\Omega) = \frac{1}{|\Omega|}\sum_{q\in\Omega} S(g;q) = \frac{1}{|\Omega|}\sum_{q\in\Omega} S(g(q))$$

where g represents the inverse response function, and where $|\Omega|$ represents a number of the noise distributions in $\Omega$, the set of noise distributions, where S represents the degree of symmetry, and where q represents a noise distribution of the set of noise distributions $\Omega$.

19. The computer-readable medium of claim 15 wherein the inverse response function is represented as:

$$g = g_0 + Hc$$

where $g_0$ is a mean response function of a plurality of response functions, and where H is a matrix whose columns are composed of N eigenvectors, and where c is an N-dimensional vector of principal components analysis coefficients.

20. The computer-readable medium of claim 15 wherein the computing the inverse response function comprises selecting an inverse response function from a database of inverse response functions wherein the selected inverse response function is indexed by a set of coefficients of a parametric model of the inverse response functions in the database.

* * * * *

UNITED STATES PATENT AND TRADEMARK OFFICE
CERTIFICATE OF CORRECTION

PATENT NO. : 8,149,300 B2  
APPLICATION NO. : 12/110357  
DATED : April 3, 2012  
INVENTOR(S) : Matsushita et al.

Page 1 of 1

It is certified that error appears in the above-identified patent and that said Letters Patent is hereby corrected as shown below:

On the Title Page, item (74), under "Attorney, Agent, or Firm" column 2, line 1, delete "Colins;" and insert -- Collins; --, therefor.

In the Claims

In column 11, line 40, In Claim 9, delete "a where" end insert -- where --, therefor.

In column 12, line 46, In Claim 17, delete "a where" and insert -- where --, therefor.

In column 12, line 65, In Claim 19, delete "$g=g_o\text{'Hc}$" and insert -- $g=g_o+Hc$ --, therefor.

Signed and Sealed this  
Third Day of February, 2015

Michelle K. Lee  
*Deputy Director of the United States Patent and Trademark Office*